US007138927B2

(12) United States Patent
Fang et al.

(10) Patent No.: US 7,138,927 B2
(45) Date of Patent: *Nov. 21, 2006

(54) UNIVERSAL REMOTE CONTROLLER WITH VOICE AND DIGITAL MEMORY

(76) Inventors: Calvin C. Fang, 20955 Pathfinder Rd., Ste. 100, Diamond Bar, CA (US) 91765; Philip K. Yu, 20955 Pathfinder Rd., Ste. 100, Diamond Bar, CA (US) 91765

( * ) Notice: Subject to any disclaimer, the term of this patent is extended or adjusted under 35 U.S.C. 154(b) by 0 days.

This patent is subject to a terminal disclaimer.

(21) Appl. No.: 11/317,132

(22) Filed: Dec. 23, 2005

(65) Prior Publication Data

US 2006/0132326 A1 Jun. 22, 2006

Related U.S. Application Data

(63) Continuation of application No. 09/803,272, filed on Mar. 9, 2001, now Pat. No. 6,980,120.

(60) Provisional application No. 60/188,972, filed on Mar. 10, 2000.

(51) Int. Cl.
*G08C 19/00* (2006.01)
*H04M 1/00* (2006.01)
*H04M 3/00* (2006.01)

(52) U.S. Cl. ............................ 340/825.69; 455/561.1; 455/418; 455/563; 455/556.1; 455/556.2

(58) Field of Classification Search ........... 340/825.69; 455/561.1, 418, 563, 556.1, 556.2
See application file for complete search history.

(56) References Cited

U.S. PATENT DOCUMENTS

| | | | | |
|---|---|---|---|---|
| RE35,952 | E * | 11/1998 | Beery | 348/731 |
| 6,178,338 | B1 * | 1/2001 | Yamagishi et al. | 455/566 |
| 6,370,506 | B1 * | 4/2002 | Ahluwalia | 704/275 |
| 6,529,233 | B1 * | 3/2003 | Allen | 348/211.2 |
| 6,980,120 | B1 * | 12/2005 | Yu et al. | 340/825.69 |

* cited by examiner

*Primary Examiner*—Jeffery Hofsass
*Assistant Examiner*—Scott Au
(74) *Attorney, Agent, or Firm*—East IP Group

(57) ABSTRACT

An improved universal remote control unit (URC) for controlling electronic appliance units. The URC unit has the typical remote controller module for controlling appliances such as TV, stereo, VCR or DVD. Additionally, the URC has a scratch pad memory for storing telephone numbers and web site information entered through the URC unit's alphanumeric keys. When activated, the key pad entries are stored in the memory, instead of being used to control the appliance. The URC unit further has a digital recorder module that can be implemented with a microphone, a voice recorder chip and a speaker, all integrated with the URC unit. The digital recorder module can even use the battery that is typically used by the URC unit. The URC unit further has a display screen to display the information stored in and recalled from the memory.

18 Claims, 4 Drawing Sheets

UNIVERSAL REMOTE CONTROLLER WITH VOICE AND DIGITAL MEMORY

CROSS REFERENCE TO RELATED APPLICATION

The present application is a continuation of U.S. patent application, application Ser. No. 09/803,272, filed Mar. 9, 2001 now U.S. Pat. No. 6,980,120, entitled UNIVERSAL REMOTE CONTROL WITH DIGITAL RECORDER, which claims priority from provisional application, application No. 60/188,972, entitled "UNIVERSAL REMOTE CONTROL WITH DIGITAL RECORDER AN HANDS-FREE UNITS FOR IN-CAR USE OF MOBILE PHONES WITH DIGITAL RECORDER," filed on Mar. 10, 2000. The entire disclosure of the prior applications is incorporated as if fully set forth herein.

RELATED FIELD

The present invention relates to common remote control units for consumer electronics appliances and for hands-free units for mobile phones, and more particularly relates to universal remote control units for television and entertainment units.

ART BACKGROUND

As technology becomes more powerful and sophisticated, the designers for consumer electronics units, such as televisions or stereo sets, have become more and more obsessed with how to make the appliance units more sophisticated. While features such as picture-in-picture, on-screen menu and web access are developed, the designers have overlooked the most basic feature of convenience helpful to the consumers.

The first example lies in the universal remote control (URC) for home TV or stereo units. Nowadays, the URC is becoming more sophisticated and more powerful for the consumers, by allowing the consumers to control not just TV, but also a host of other home units, such as stereo, VCR, DVD, or Cable Box. All the consumer needs is just one URC in hand, after programming the URC for different entertainment units, and the consumer will be able to use the same URC to control all different units.

There is, however, one basic need that has been completely overlooked by the designers of such URCs. It is quite often that while watching or listening to a TV or stereo program, a particular piece of information may attract the attention of the consumer. How does the consumer get out of her comfort, i.e. the couch, to write down such information that is flashing by on the television? Typically, the consumer will try to find a pen and paper to write down the information, if such items are nearby. Alternatively, the consumer may begin repeating the information incessantly, e.g. the "800" telephone number needed to order a kitchen tool, while rushing to find a pen to write it down. Particularly for older people or people with physical limitations, neither is a good option. As such, with all the power and sophistication developed for the URCs, it cannot help the consumers in this simple situation of needs.

Almost all entertainment appliances now come with its own URC, which has become a inseparable part of our viewing and listening activity. In fact, the URC is sometimes blamed for the creation of "couch potatoes," in reference to those who rely heavily on the URC. There is an extremely good chance that while viewing TV, a TV viewer will be closer to the URC than to a cordless telephone, or to a pen. It is also possible that a TV viewer is sitting or lying down in a comfortable and relaxed position, instead of sitting upright or at the desk. There is nothing special about the assertion, since TV viewing is supposed to engage the attention of the viewer and the viewer needs the URC to control, or to change channels. A viewer is expected to change channels, control the volume or programming of the TV or stereo using the URC, while watching the TV or listening to the stereo. A viewer is not, however, expected to use the phone, unless someone calls, or take notes when he or she is watching TV. The comparison between the URC and the telephone is not to play down the importance of the telephone, but to illustrate what is more natural for people during TV viewing or stereo listening. It is safe to say that during TV viewing, people are much closer to a URC than to a phone or a pen and paper. Even when people move around in their viewing position, they tend to hang on to the URC, instead of the phone.

The URC is also becoming more sophisticated in that a remote control can be programmed to target not only the TV set, but also the VCR, DVD, set-top box or even stereo. In a recent article in the September 1999 issue of *Smart Money*, vendors are touting URCs, which can embody enough technology such that a typical URC costs over $150.

For example, as mentioned in the article, a top-ranked "Deluxe" URC is made by Sony (Model: RM-AV2000) with a price tag of $179.99. A midrange model is Sony RM-V801 at $49.99. Of course, there is also the "No Frills" kind, such as the one made by RCA (SystemLink4) at $19.99. In all of the reported models, as well as the models commonly available at the market place, the much touted features among the various kind of URCs are how many different piece of entertainment units they can control, or how easy the interface is. Indeed, while the URC can control just about everything possible with respect to a viewer's home appliances, it does not help a viewer when it comes to helping him take down the simple information that was just briefly shown on TV, or played on the radio. There is a long-felt need by the consumers, whether they are young, old, healthy or physically challenged, that have been entirely ignored by the URC and TV/appliance manufacturers and designers.

Therefore, it will be desirable to have a way to help the TV viewer, or stereo listener, take down information accurately and conveniently without having to get out of their position of comfort.

It is also desirable to be able to take down information from the TV, stereo or radio using an apparatus most conveniently located within the viewer's reach.

Another example of over-developed technology failing to address simple needs lies in the wireless phones, e.g. the cellular phone, for those who tend to call while driving. Talking on the phone while driving has been linked to several automobile accidents due to driver's distraction. What is more dangerous is when the driver needs to write down information, such as the other party's telephone number or the direction to the next meeting, while driving. One of the driver's hands is already occupied by the phone set, while the other hand is occupied by the steering wheel. There is no hand left to write down any information without some dangerous maneuvering. Some phone manufacturers have already come up with "scratch pad" feature on the phone so that the consumer can punch the number to record it. U.S. Pat. No. 6,021,325, issued to David Hall on Feb. 1, 2000, entitled "MOBILE TELEPHONE HAVING CONTINUOUS RECORDING CAPABILITY," illustrates such device. Another U.S. Pat. No. 5,867,793 issued to Eddie Davis on Feb. 2, 1999, entitled "BUILT-IN, CELLULAR TELEPHONE MESSAGE RECORDER," also illustrates such feature. Having the recorder built-in on the mobile phone is still too dangerous, since operating the phone or the recorder requires the hands, even though activation may require voice or hand command. Both the Hall and Davis patent disclosures are incorporated herein as background information by reference.

Here comes the latest for talking on the phone while driving: a hands-free unit for the phone. The hands-free unit is essentially a speaker adapter that can either be built into the car's stereo system or be implemented with the cigarette lighter adapter. The hands-free unit makes driving a little safer, since the driver no longer needs to use the hands to hold on to the phone while talking. However, what happens when the driver needs to remember certain information given out by the other party? The built-in mobile phone as illustrated by the Hall or Davis patents would not seem to work, since the phone is not used. The driver needs to use the hand somehow, even though the talking part is now hands-free. Despite the sophistication in the wireless phone and accessory technology, the basic need has been overlooked, again. And this time, it becomes a safety issue.

SUMMARY OF THE INVENTION

An improved universal remote control unit (URC) for controlling electronic appliance units is disclosed. The URC unit has the typical remote controller module for controlling appliances such as TV, stereo, VCR or DVD. Additionally, the URC has a scratch pad memory for storing telephone numbers and web site information entered through the URC unit's alphanumeric keys. When activated, the key pad entries are stored in the memory, instead of being used to control the appliance. The URC unit further has a digital recorder module that can be implemented with a microphone, a voice recorder chip and a speaker, all integrated with the URC unit. The digital recorder module can even use the battery that is typically used by the URC unit. The URC unit further has a display screen to display the information stored in and recalled from the memory.

DETAILED DESCRIPTION OF THE PREFERRED EMBODIMENT

The present invention is directed to an improved URC with a built-in digital voice recorder to allow the consumer to quickly record any desired information for playback. Digital recorders such as these have been recently made much more affordable, thanks to solid-state memory. The recorders do not need any tapes, nor any move parts. They typically come as a chip set, ready to be implemented in any application.

The improved URC of the present invention has a module for controlling ordinary multiple appliance sets, while incorporating a digital recorder which allows recording voices from either the consumer, or from the TV, stereo, wherever the message is delivered from. With this feature, the improved URC of the present invention eliminates the need of a viewer to rush to a pen and paper, while the commercial is flashing by. Also, it eliminates the need for the viewer to try to memorize the information by verbal repetition, while looking for a pen and paper. For senior citizens or people with physical limitations, this improved URC can help them significantly. This improved URC also helps those average "couch potatoes" who always claim to have just found a perfect sitting position.

Figure 1:
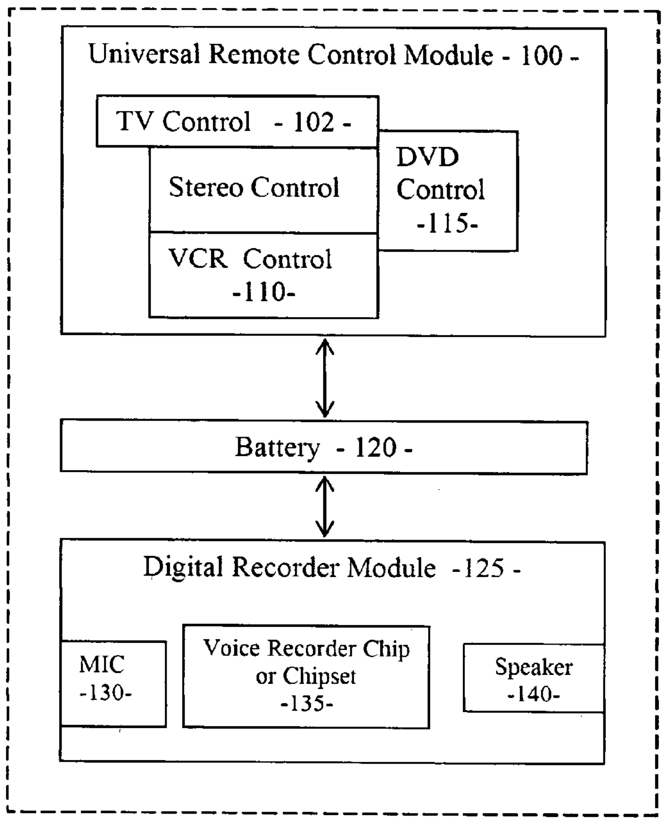
FIG. 1 is a simplified diagram of the improved URC unit with the digital recorder module of the present invention.

FIG. 1 shows a simplified diagram of the improved URC with the digital recorder module 125 in accordance with the present invention. As shown in FIG. 1, the digital recorder module 125 shares the battery 120 with the URC module 100. It should apparent to those skilled in the art that the digital recorder module 125 may have its own power source, without reliance on the battery for the URC module 100. The embodiment, as shown in FIG. 1, is intended to have a built-in digital recorder module with the URC module 100. However, as will be disclosed in the present application, an add-on digital recorder module is also available for retrofitting an existing URC. In such applications, it may be preferable for the add-on digital recorder to have its own power source, so that the additional piece will not interfere with the existing URC. Further, there is advantage of not having to deal with the electrical connection between the existing URC and the add-on digital recorder.

As shown in FIG. 1, the URC module 100 has TV control 102 to control the TV, stereo control 105 to control the stereo, VCR control 110 to control the VCR and DVD control 115 to control the DVD unit. Of course, control units for set top box, cable box or other appliances can also be added by those skilled in the art. It should be appreciated by those skilled in the art that these units are functional units, wherein the implementation for various control units is done by programming a microprocessor (not shown) to operate based on the user input. For example, the user presses a "TV" button on the remote control to instruct the microprocessor to interpret any subsequent keystrokes as they apply to the TV functions, e.g. changing the channels or controlling the volume. Pressing the "Cable" button on the remote instructs the microprocessor to interpret any subsequent keystrokes as they apply to the cable box, e.g. changing the channel or activating the pay-per-view. The design, functionality and manufacturing aspects of the URC module, by itself, have been well-known to those skilled in the art.

Figure 2:
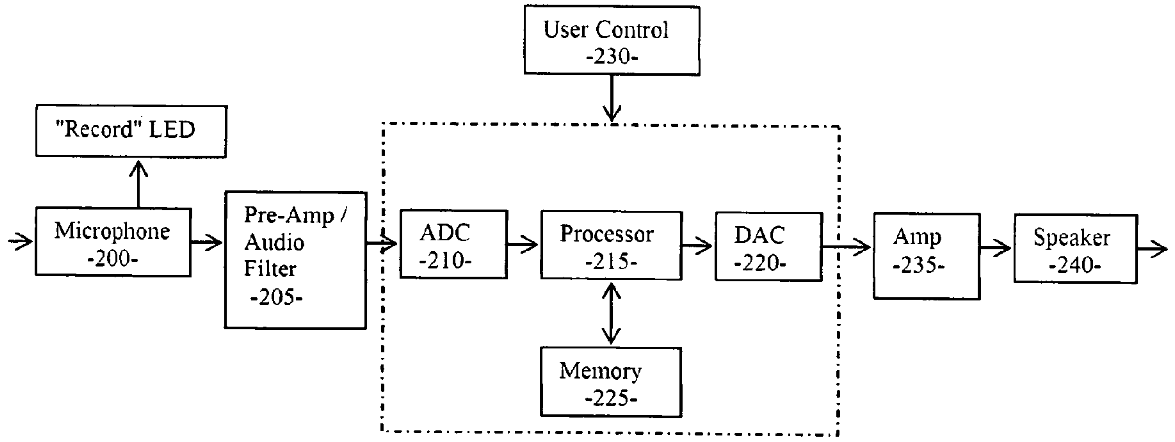
FIG. 2 illustrates a simplified block diagram of the voice recorder.

FIG. 2 shows a simplified block diagram of the digital voice recorder module 125. The voice recorder, which is to be incorporated by the URC as shown in FIG. 1, can record at least a few seconds of information from the consumer, from the TV or from wherever the source is. It has a microphone 200 for receiving voice signals, a pre-amplifier and filter 205, an analog-to-digital converter 210 for converting the analog signals into digital, a digital processor 215 for processing the signals and a memory 225 to record the signals. The memory preferably is a non-volatile memory for power conservation purposes. An "RECORD" LED can be used to indicate that the recorder is indeed recording.

For playback, the signals stored in the memory 225 is converted from digital to analog and amplified by a digital amplifier 235, before it is played out through its speaker 240. It should be apparent to those skilled in the art that the digital voice recorder, by itself, is available either in chipset form from companies such as Information Storage Devices ("ISD"), Inc., of San Jose, Calif., or in finished product form, although as a recorder-only unit. Radio Shack® has carried such digital recorder units as part of a key chain, for a price of around $15 retail. Despite its existence, the full power of the digital recorder has not been appreciated from the eyes of the designers of the TV and stereo units. As such, any advancement in URC technology notwithstanding, the basic need of a consumer during TV viewing has been overlooked.

Products offered by ISD, No. ISD2500 and ISD5008, use an EEPROM storage method to allow analog data to be written directly into a single cell without ADC or DAC conversion. Further, as mentioned above, such The Product Briefs for ISD2500 and ISD5008, and Product Introduction for ISD2560/75/90/120 are hereby incorporated by reference. Despite the availability of these components in recent times, they have not contributed to the universal remote control.

Why should the digital voice recorder be implemented with the URC? As mentioned before, it is highly probable that while watching TV or listening to stereo, the consumer will have his or her URC very close by or within easy reach, perhaps even more so than pens and paper. All the URCs available in the market place are competing based on their ease of programming and universality, making it more likely that the URCs will stay very close to the consumers. Nothing has addressed the seemingly tangential need of the consumers, while watching TV or listening to stereos to easily record short and transient information.

The voice recorder can use its own power, or rely on the power source from the URC. Its power consumption can be kept very low, since it consumes power only while recording or playing back. The rest of the time it does not consume power at all. It can use a "RECORD" button, with or without an LED, for recording and a "RECORD" button for play back. This represents the simple solution. While others can certainly come up with more features to make a fancier unit, the basic idea is to have the digital recorder with the URC such that the URC's proximity to the consumer is fully exploited. When the consumer sees or hears any message or information from the TV or stereo that she wants to remember, she can point the URC at the source and press the record button to record the message from the TV directly.

Alternatively, the consumer can just repeat the information and speak into the microphone 200 of the URC directly. Typically, a 20-second duration for the memory should be sufficient, but if memory becomes cheaper, more capacity can be built in. The information is maintained by the memory 200 until the next record session, which will overwrite the recording. The recorder preferably uses non-volatile memory so that the recorded information can be kept for long term purpose even after power is disconnected. The recorder will preferably continue to fill up its memory and loop back to the beginning when full, so that the last 20 seconds of information will always be kept. Of course, how the memory is implemented, e.g. duration, "first-in first-out," or loop back, can be customized by those skilled in the art based on their particular applications.

Saving through Keypad Entry

Figure 3:
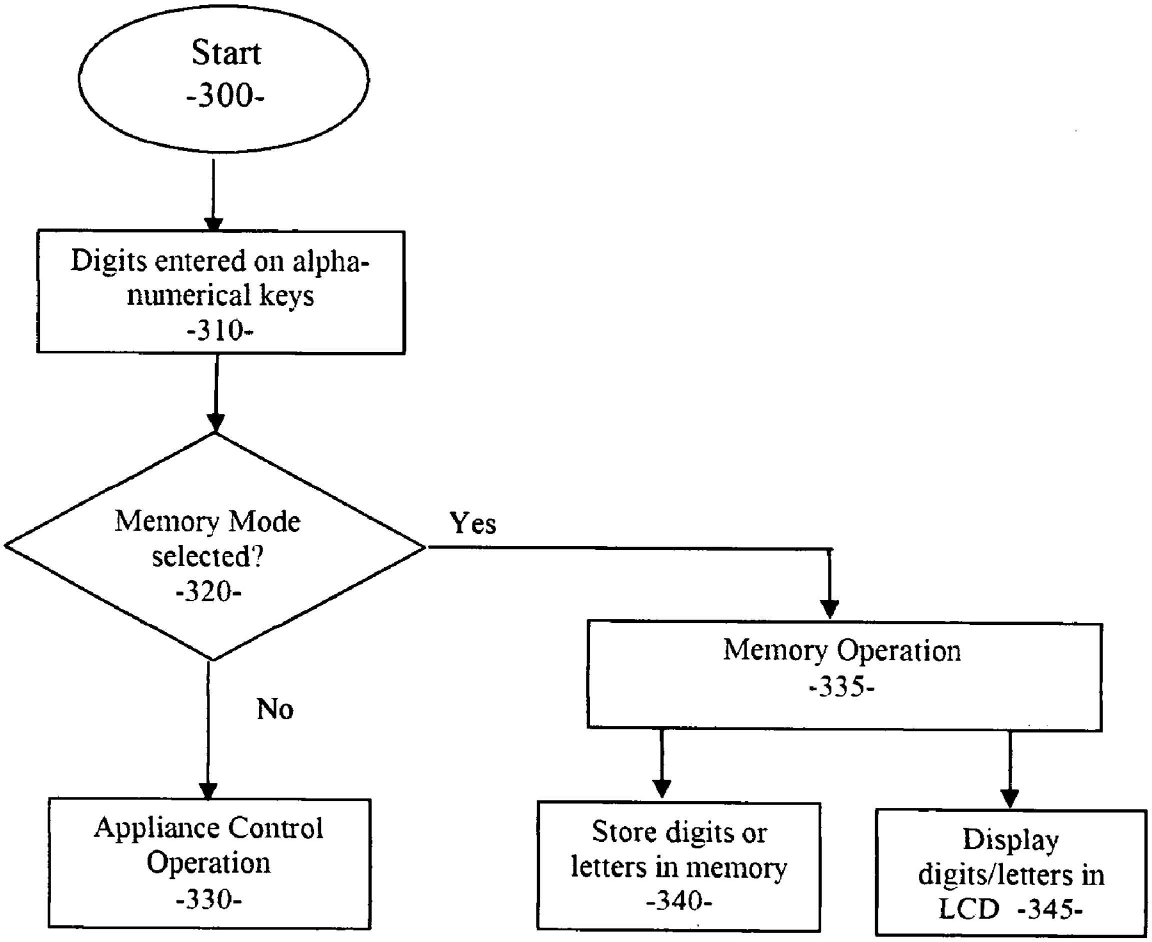
FIG. 3 illustrates a simplified flow diagram of the process of an exemplary URC with numerical key entry operations.
Figure 4:
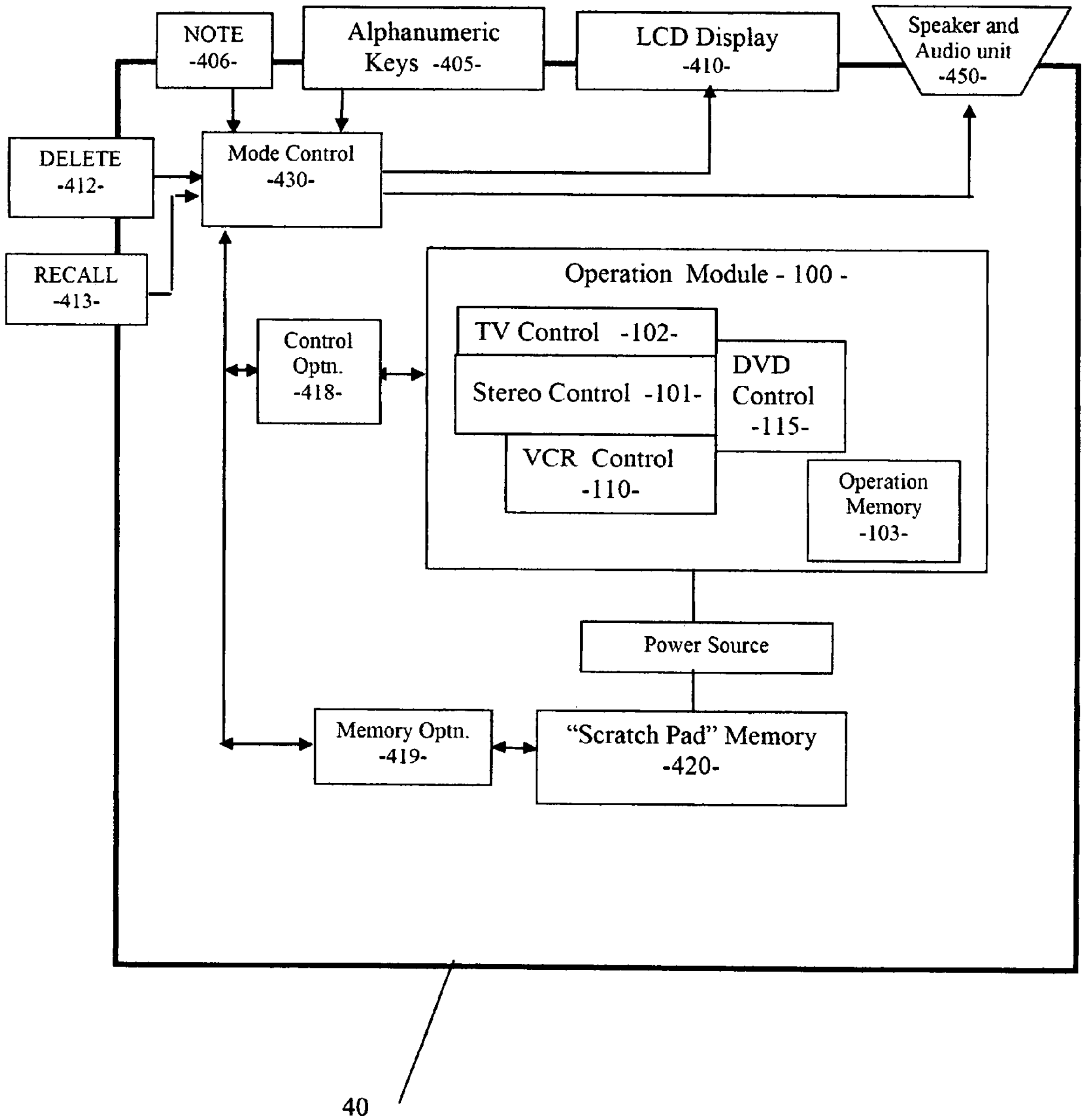
FIG. 4 illustrates a simplified block diagram of an exemplary URC with numerical key entry and recall operations.

Reference is turned to FIGS. 3 and 4, where an exemplary URC 40 with memory function is illustrated. As an add-on to, or replacement of, the digital voice recorder on the URC to record important phone number, the URC may implement what is commonly called a "scratch pad memory," or some sort of "quick access" memory, to store numbers entered through the numerical (or alphanumerical) keys on the URC. The use of the "scratch pad memory" 420 could also be quite advantageous, since the numerical (or alphanumerical) keys are already an integral part of the URC 40.

FIG. 3 illustrates a simplified flow chart of the exemplary operation and FIG. 4 illustrates a simplified system diagram of the exemplary URC 40 with the "scratch pad memory" 420. Preferably, when the user wishes to save a phone number of a website information he just heard on TV, all he needs to do is to press a series of alphanumerical keys 405 on the URC 40 to record the phone number or the website. When the keys are entered, they should be stored in the memory 420 of the URC 40, instead of acting to change the channels or control the appliance. To differentiate between a control operation 418 and a memory operation 419, a "NOTE" button/switch 406 may be used to set the mode control 430. When the "NOTE" button 406 is pressed, the mode control is set to "memory operation" 419. As such, the URC 40 is instructed to store the series of keys in the memory 420, through memory operation 19, and display them on the LCD 410, instead of changing the channels on the TV through control operation 418. By using the "NOTE" button 406, or other equivalent mode-selection scheme, the user is commanding the URC 40 not to interpret the keys, or digits, entered as a channel selection, which would be terribly frustrating and confusing. The entered keys, or digits, would simply remain in the memory 420 without changing the TV channels for the users. The data in the memory 420 and displayed LCD display 410 may stay put, until overwritten by the next entry, or when it is recalled by a recall button/switch 413. The use of numerical alphanumerical keys 405 and memory 420 might be advantageous over the voice recorder, in some applications, if the user is speech-impaired or hearing impaired. Either physical limitation makes accurate recording using the voice recorder difficult, if not impossible.

By using the "NOTE" button 406, the user selects the mode of operation of the URC 40. The URC 40 thus would not interpret the digits, or letters, entered as control operation 418. The entered digits or letters would simply be stored in the memory 420, through memory operation 419, without changing the TV channels for the users. For example, when the user tries to enter a phone number, say, "800-123-4567," the URC should be prevented from switching to channel "80" or "800," if the user has properly selected the mode of operation 430, by pressing the "NOTE" button/switch 406. Without this mode selection function, the URC may, and probably will, erroneously read the first two or three digits entered as a channel through its control operation 418. As can be appreciated by those skilled in the art, control operation 418 may be the default operation of the URC 40, since controlling the appliances is the primary job of the URC. However, when the mode of operation is changed, the digits or letters entered by the user are forwarded, by the memory operation 419, to the memory 420, and LCD display 450 (if implemented).

Alternately, the mode control 430 may be achieved by determining whether there is a $3^{rd}$ or $4^{th}$ digit, say within 2 seconds, following the first two or three digits. If not, then the first two or three digits are interpreted as a desired channel, which will cause the control operation 418 to switch the channels or control the appliances. If there are more digits following the $2^{nd}$ or $3^{rd}$ digit, the memory operation 419 is activated and the whole series of digits or letters is to be stored in the scratch pad memory 420 and displayed by the LCD 410.

Further, the NOTE button 406 and mode control 430 may be implemented with a voice-recognition operation, which allows the user to activate the memory 420 by speaking "NOTE" or any pre-programmed phrase, into the URC 40. Upon recognizing the phrase, the URC will interpret the subsequent digits as information, e.g. phone number, to be stored in the memory 420 and to be displayed by the LCD 410. This intelligent mode select scheme, as an add-on or replacement of the NOTE button 406, can obviates the NOTE button 406.

It should be noted that by "scratch pad memory," it is intended to represent a memory physically or virtually allocated for performing the specific temporary memory. It may be a block of virtual memory allocated out of the memory blocks used for various control and programming functions, or it may be a physical memory separate and apart from the operation (FIG. 4, 103) memory blocks. The solution is entirely dependent on the specific design choice.

When the scratch pad memory 420 and LCD 410 are implemented in the URC 40, it is preferable that a DELETE, or EDIT, button/switch 412 be also implemented so that the user can delete the digit entered, in case of error. A "DELETE" button 412, when activated, may erase one digit from the memory 420 at a time, or the whole entry if the user presses the button for more than a few seconds, thus erasing the whole line of digits from the memory 420. The "DELETE" button 412 could be considered a "BACK-SPACE" button on a computer keyboard.

Voice or Audible Recall

Additionally, a RECALL button 413 may be implemented to recall the numbers stored in the memory 420. The RECALL button 413 may also activate an audio and speaker unit 450 on the URC 40 so that the number is annunciated through the speaker 450. For an exemplary URC with digital recorder already implemented, the audio and speaker unit 450 is already part of the design.

Figure 5:
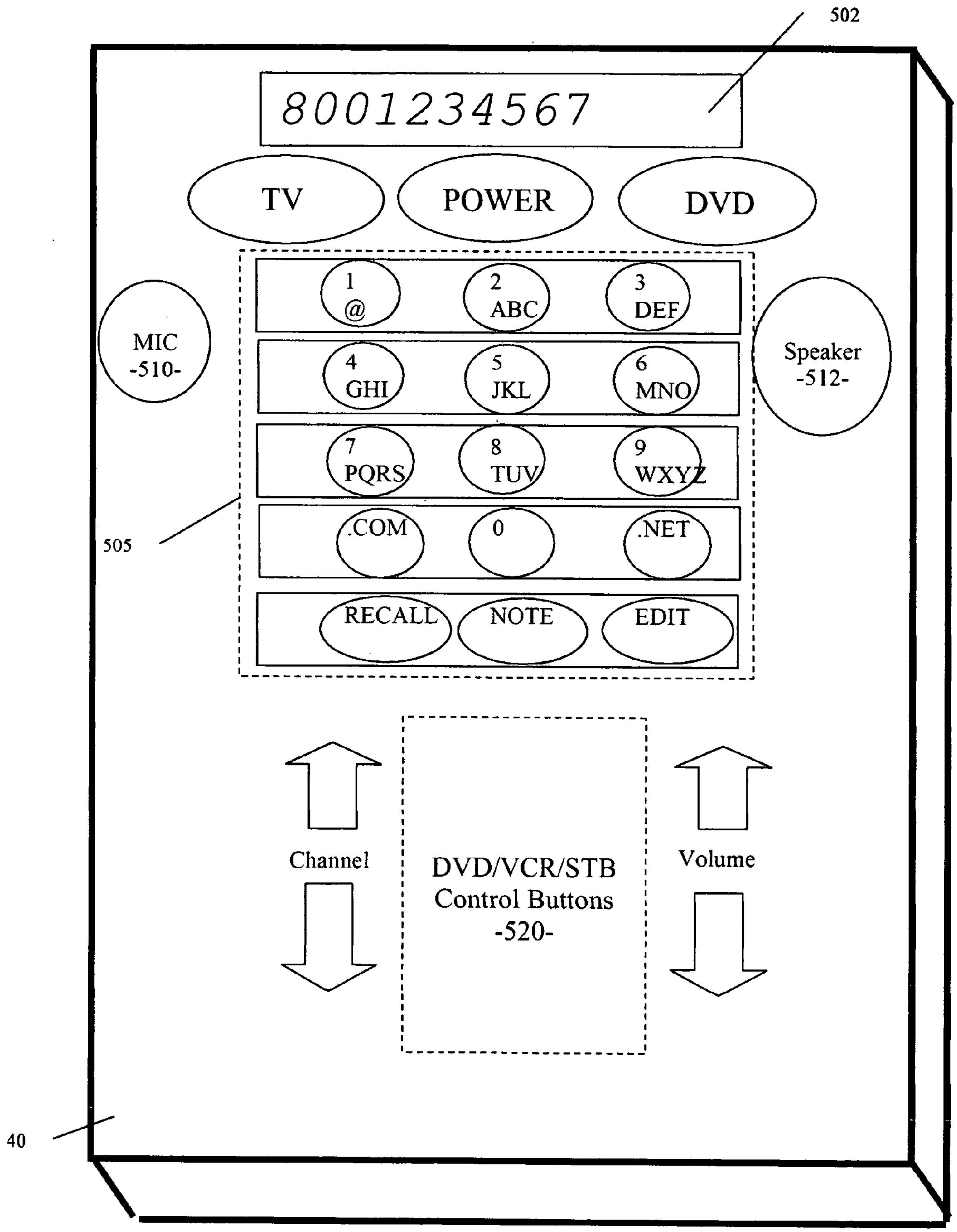
FIG. 5 is a simplified diagram showing an exemplary industrial design of the URC 40 in accordance with the present invention.

FIG. 5 is a simplified diagram showing an exemplary industrial design of the URC 40 in accordance with the present invention. The key pad 505 is alphanumeric, which allow entry of digits for phone numbers, and letters for website information. When in memory mode, the LCD display 502 displays the phone number or website entered through the keypad 505. MIC 510 allows the user to speak into the URC 40, and speaker 512 plays out any recorded information from the memory. Control buttons 520 are typical of those buttons required for operating a DVD player, VCR or Set-top Box. Note that both RECALL and EDIT buttons are implemented on the keypad 505.

The URC in accordance with the present invention may be implemented with only a voice recorder, with only a scratch pad memory with LCD, or with both the voice recorder and scratch pad memory with LCD, depending on the application and cost structure. In either event, the user has a way to record a piece of information, e.g. a phone number or website seen on TV, through the digital voice recorder or through a temporary memory with LCD display.

The present invention may be embodied in other specific forms without departing from the spirit or essential characteristics thereof. The present embodiments are to be considered in all respects as illustrative, and not restrictive. The scope of the invention is therefore, indicated by the appended claims rather than by the foregoing description, and all changes which come within the meaning and range of equivalency of the claims are to be embraced within their scope.

We claim:

1. A universal remote control ("URC") to control at least one electronic appliance, comprising:

a housing;

a first control circuit which, responsive to a user's command, remotely controls the operation of the at least one electronic appliance, the first control circuit being located within the housing;

a digital voice recorder, disposed within the housing, which records audio signal from both a user and the user's ambience, and plays back said audio signal, responsive to a user's command, said digital voice recorder and said first control circuit being operationally independent of each other;

a power supply located within said housing, said power supply being adapted to provide power to said first control circuit and said digital voice recorder, further comprising a plurality of keys located on a top surface of the housing, representing a set of numerical keys corresponding to the numerals "0" through "9";

a scratch pad memory which, upon activation by the user, controllably stores the numerical keys entered by the user, independent of the operation of said first control circuit so as not to interfere with the operation of said appliance;

a display located on the housing to display the numerical keys entered by the user.

2. The URC according to claim 1, wherein the digital voice recorder comprises:

a microphone to receive the audio signal from both the user and the user's ambience;

a processor to process the received audio signal from said microphone;

a memory to store the processed received audio signal, said memory and said first control circuit being operationally independent of each other;

a speaker to play back the audio signal, and a second control circuitry to operate the digital voice recorder upon the user's command.

3. The URC according to claim 1, further comprising:

alphabet keys integrated with said numerical keys;

a mode select circuit coupled to said scratch pad memory and said keys, said mode select circuit, upon activation, controllably causing the keys entered by the user to be stored into said scratch pad memory independent of the operation of said appliance.

4. The URC according to claim 3, wherein said mode select circuit comprises a switch button for setting the mode select circuit.

5. The URC according to claim 4, further comprising:

an edit circuit coupled to said scratch pad memory and said display, said edit circuit being adapted to controllably edit at least one digit or letter stored in said memory.

6. The URC according to claim 2, wherein the scratch pad memory comprises:

a first-in first-out ("FIFO") memory to store a plurality of signals;

memory control to selectively fast-forward, reverse, erase, playback, make permanent at least one of the plurality of the signals stored by the FIFO memory.

7. The URC according to claim 1, wherein the digital voice recorder comprises:

a microphone to receive the audio signal concurrently generated by both the user and the user's ambience, said microphone being operationally independent of said control circuitry's controlling of said appliance;

a memory to store the received audio signal directly from said microphone;

a speaker to play back the received audio signal stored in the EEPROM, and control circuitry to operate the digital voice recorder upon the user's command, wherein said control circuitry is operationally independent of said microphone, memory and speaker.

8. A universal remote control ("URC") to control at least one electronic appliance, comprising:

a portable housing (40);

a plurality of keys (405) located on a top surface of said portable housing, comprising a set of numerical keys corresponding to the numerals "0" through "9", superimposed by alphabets from letter "A" through "Z";

a first control circuit (418) which, responsive to inputting from said keys, remotely controls the operation of the at least one electronic appliance, the first control circuit being located within the housing;

a memory (420) which controllably stores the keys entered by the user, independent of the operation of said first control circuit;

an LCD display (450) located on the top surface of the housing to display the keys stored in said memory;

a second control circuit (419) coupled to said scratch pad memory, said second control circuit being adapted to controllably store the numerical keys entered by the user to into said scratch pad memory, independent of the operation of said first control circuit;

a mode control circuit (430) coupled to said first and second control circuits for selecting one of said first and second control circuits to operate independent of the other.

9. The URC according to claim 8, further comprising:

an edit circuit (412) coupled to said mode control circuit and said second control circuit (419), said edit circuit being adapted to controllably edit information stored in said memory and displayed by said display;

a recall circuit (413) coupled to said mode control circuit, said second control circuit and said display, said recall circuit being adapted to controllably recall information stored in said memory and display said information on said display.

10. The URC according to claim 9, further comprising:

an audio and speaker unit (450) coupled to said mode control, said audio and speaker unit being adapted to controllably annunciate said information stored in said memory upon activation by said recall circuit.

11. The URC according to claim 8, further comprising:

a digital voice recorder, disposed within the housing, which records audio signal from both the user and the user's ambience, and which plays back said audio signal, responsive to a user's command, wherein said digital voice recorder operates independently of said control circuitry's controlling of said appliance.

12. The URC according to claim 8, wherein said mode control selects one of said control operation (418) and said memory operation (419) based on a predetermined delay between successively entered keys (405).

13. The URC according to claim 9, wherein said mode control selects one of said control operation (418) and said memory operation (419) based on a predetermined delay between successively entered keys (405).

14. The URC according to claim 8, wherein said mode control selects one of said control operation (418) and said memory operation (419) based on voice-recognition of a speech phrase received by said URC.

15. An URC for remotely controlling at least one appliance, comprising:

a portable housing (40) having a form factor for palm-top handling;

a set of keys disposed on said portable housing for generating data signals representative alphanumeric signals;

a first control signal circuit (406) for controllably generating a first control signal;

an operation module (100) disposed within said portable housing for controlling said at least one appliance remotely;

a control operation circuit (418) coupled to said operation module for controllably activating said operation module based on said data signals;

a memory unit (420) disposed within said portable housing for controllably storing said control signals;

a memory operation circuit (419) coupled to said memory unit for controlling said memory unit;

a mode control circuit (430) coupled to said first control signal circuit, said control operation circuit and said memory operation circuit, for controllably activating one of said control operation circuit and said memory operation circuit based on said first control signal, said mode control circuit controllably causing said data signals to be stored in said memory without interfering with said operation module;

a LCD display (410) for displaying said data signals at least when said memory operation is selected by said mode control circuit.

16. The URC of claim 15, further comprising:

a second control signal circuit (412) coupled to said mode control circuit and said memory operation circuit, for controllably editing said data signals stored in said memory;

a third control signal circuit (413) coupled to said mode control circuit and said memory operation circuit and said display, for controllably recalling said data signals stored in said memory;

an audio and speaker unit (450) coupled to said mode control circuit, for generating an audio signal representative of said data signals stored in said memory, upon recalling by said third control signal.

17. The URC of claim 16, wherein:

said first control signal circuit (406) is a predetermined audio signal;

said mode control circuit (430) makes its selection of one of said control operation circuit and said memory operation circuit based on speech-recognition of said predetermined audio signal.

18. The URC of claim 17, further comprising:

a microphone for receiving an audio signal;

a digital voice recorder, disposed within the portable housing, which controllably records an audio signal and plays back said audio signal;

a power supply located within said housing, said power supply being adapted to provide power to said control operation circuit, said digital voice recorder, said memory operation circuit, said memory, said display and said mode selection circuit.

* * * * *